United States Patent
Boman et al.

(10) Patent No.: US 7,353,003 B2
(45) Date of Patent: Apr. 1, 2008

(54) HOUSING FOR AN ELECTRONIC DEVICE

(75) Inventors: Petri Boman, Woking (GB); Kevin Hinge, Woking (GB)

(73) Assignee: Nokia Corporation, Espoo (FI)

( * ) Notice: Subject to any disclaimer, the term of this patent is extended or adjusted under 35 U.S.C. 154(b) by 622 days.

(21) Appl. No.: 09/990,133

(22) Filed: Nov. 21, 2001

(65) Prior Publication Data

US 2002/0061736 A1  May 23, 2002

(30) Foreign Application Priority Data

Nov. 22, 2000 (GB) .................................. 0028464.6

(51) Int. Cl.
*H04B 1/38* (2006.01)

(52) U.S. Cl. .................. 455/90.3; 455/575.1; 455/573; 455/550.1

(58) Field of Classification Search ............... 455/90.3, 455/550.1, 573, 575.1, 347, 348, 349, 351; 379/433.12, 433.01
See application file for complete search history.

(56) References Cited

U.S. PATENT DOCUMENTS

| | | | |
|---|---|---|---|
| 4,443,656 A | 4/1984 | Linse | |
| 5,068,917 A | 11/1991 | Sugiyama et al. | |
| 5,574,253 A | 11/1996 | Golob et al. | |
| 5,752,205 A * | 5/1998 | Dzung et al. | 455/575.1 |
| 5,777,856 A | 7/1998 | Phillips et al. | |
| 5,896,277 A * | 4/1999 | Leon et al. | 361/814 |
| 6,004,690 A | 12/1999 | Van Lerberghe | |
| 6,011,699 A * | 1/2000 | Murray et al. | 361/814 |
| 6,035,035 A * | 3/2000 | Firooz | 379/433.1 |
| 6,073,027 A * | 6/2000 | Norman et al. | 455/575.4 |
| 6,111,760 A * | 8/2000 | Nixon | 361/814 |
| 6,229,994 B1 * | 5/2001 | Pavet | 455/575.1 |
| 6,400,967 B1 * | 6/2002 | Nilsson | 455/563 |
| 6,503,005 B1 * | 1/2003 | Cockerill et al. | 400/88 |
| 6,516,202 B1 * | 2/2003 | Hawkins et al. | 455/556.2 |
| 6,580,923 B1 * | 6/2003 | Kubo | 455/558 |
| 6,718,188 B1 * | 4/2004 | Ohira et al. | 455/575.1 |
| 6,751,473 B1 * | 6/2004 | Goyal et al. | 455/556.1 |
| 2003/0025679 A1 * | 2/2003 | Taylor et al. | 345/175 |

FOREIGN PATENT DOCUMENTS

| | | |
|---|---|---|
| EP | 0414365 | 2/1991 |
| GB | 1434459 | 5/1976 |
| GB | 2321694 | 8/1998 |
| GB | 2329300 | 3/1999 |
| JP | 2000-261349 | * 9/2000 |

* cited by examiner

*Primary Examiner*—Matthew Anderson
*Assistant Examiner*—Tuan Pham
(74) *Attorney, Agent, or Firm*—Ware, Fressola, Van Der Sluys & Adolphson

(57) ABSTRACT

A housing for an electronic device is disclosed and comprises a unitary tubular body (1) having an open end (2) for insertion of electronic componentry therein. Preferably, the housing is for a mobile telecommunications device.

21 Claims, 4 Drawing Sheets

HOUSING FOR AN ELECTRONIC DEVICE

FIELD OF THE INVENTION

The present invention relates to a housing for an electronic device and, particularly but not exclusively, to a housing for a mobile telecommunications device such as a mobile telephone.

BACKGROUND OF THE INVENTION

A housing for a mobile telephone generally comprises a front and a rear casing. The electronic circuitry and other components of the telephone are mounted on one casing and the other casing part fits over it in a back-to-back relationship to form an enclosure around the circuitry and components. The two casing halves ate attached to each other and are separable to enable access to the interior of the telephone for maintenance and other requirements such as insertion or removal of a SIM card. Additionally, design conscious consumers often prefer to personalise their telephone by replacing one or both parts of the casing with another of a different colour so it is important that a consumer can separate the casing portions without difficulty. Screws or clips may be used to attach the two casing halves together.

A disadvantage with a conventional housing such as that described above is that the join between the two housing portions extends all the way around the assembled telephone housing and is clearly visible. This compromises the design and appearance of the telephone thereby reducing the overall quality and feel of the product to consumers. Furthermore, the housing of a mobile telephone is subject to considerable wear and must not break too readily when inadvertently dropped. As the conventional housing is formed in two back-to-back parts releasably joined together, the overall strength and rigidity of the housing is reduced thereby increasing the likelihood that one or both parts will break on impact. It is possible to increase the strength and rigidity of a conventional housing by increasing the thickness of the materials from which the casing is made. However, this results in an increase in overall weight which also needs to be kept to a minimum.

SUMMARY OF THE INVENTION

It is one object of the present invention to overcome or alleviate the aforementioned disadvantages associated with a conventional housing for an electronic device.

According to the present invention, there is provided a housing for an electronic device comprising a unitary tubular body having an open end for insertion of electronic components therein.

The housing preferably includes a member for closing the open end of the tubular body.

The member is advantageously configured to support electronic components thereon. The electronic components may include a printed circuit board.

In a preferred embodiment, a portion of the inner peripheral wall of the member includes a recess to receive a transducer module.

A guide is formed on the body to receive and support electronic components mounted on the member. In one embodiment, the guide means is a rail.

Preferably, the body includes a plurality of apertures in one face to receive the keys of a keymat mounted on an inner wall of the body, and an opening in the other face opposite the apertures to receive a battery pack.

The body preferably also includes means to releasably secure a keymat retaining plate over the keymat.

In a preferred arrangement, a portion of the body overlaps the member, said body and member including co-operating means to mount the member on the body.

The co-operating means conveniently includes a flange on the member that forms an interference fit with the body.

Preferably, a lock is provided for releasably securing the member mounted to the body. The lock can include an aperture in the member and a boss in the body, fastening means being insertable through the aperture for engagement in the boss.

The present invention also relates to an electronic device incorporating the housing of the invention. Most preferably, the electronic device is a mobile telecommunications device.

The electronic device preferably includes a keymat, a keymat retaining plate and a battery pack, the retaining plate being configured such that the keymat is biased against the housing by the retaining plate when the battery pack is mounted in the housing.

In a preferred embodiment, the retaining plate includes resiliently deformable regions raised out of the plane of the plate, said regions being deflected back towards the plane of the plate by the battery pack when mounted in the housing, thereby biasing the keymat against the housing.

The resiliently deformable regions are preferably a plurality of spaced parallel ribs.

The present invention also relates to a method of forming a housing according to the invention for an electronic device according to the invention by permanently attaching at least two housing portions together.

The housing portions may be attached to each other by welding.

Alternatively, the housing portions may be attached by adhesive bonding.

The present invention also relates to a method of forming a housing for an electronic device both according to the invention, including the step of forming the housing in one piece.

In one embodiment, the housing is formed by extrusion.

In another embodiment, the housing is formed from sheet metal.

DETAILED DESCRIPTION OF THE PREFERRED EMBODIMENTS

Embodiments of the invention will now be described, by way of example only, with reference to the accompanying drawings.

Figure 1:
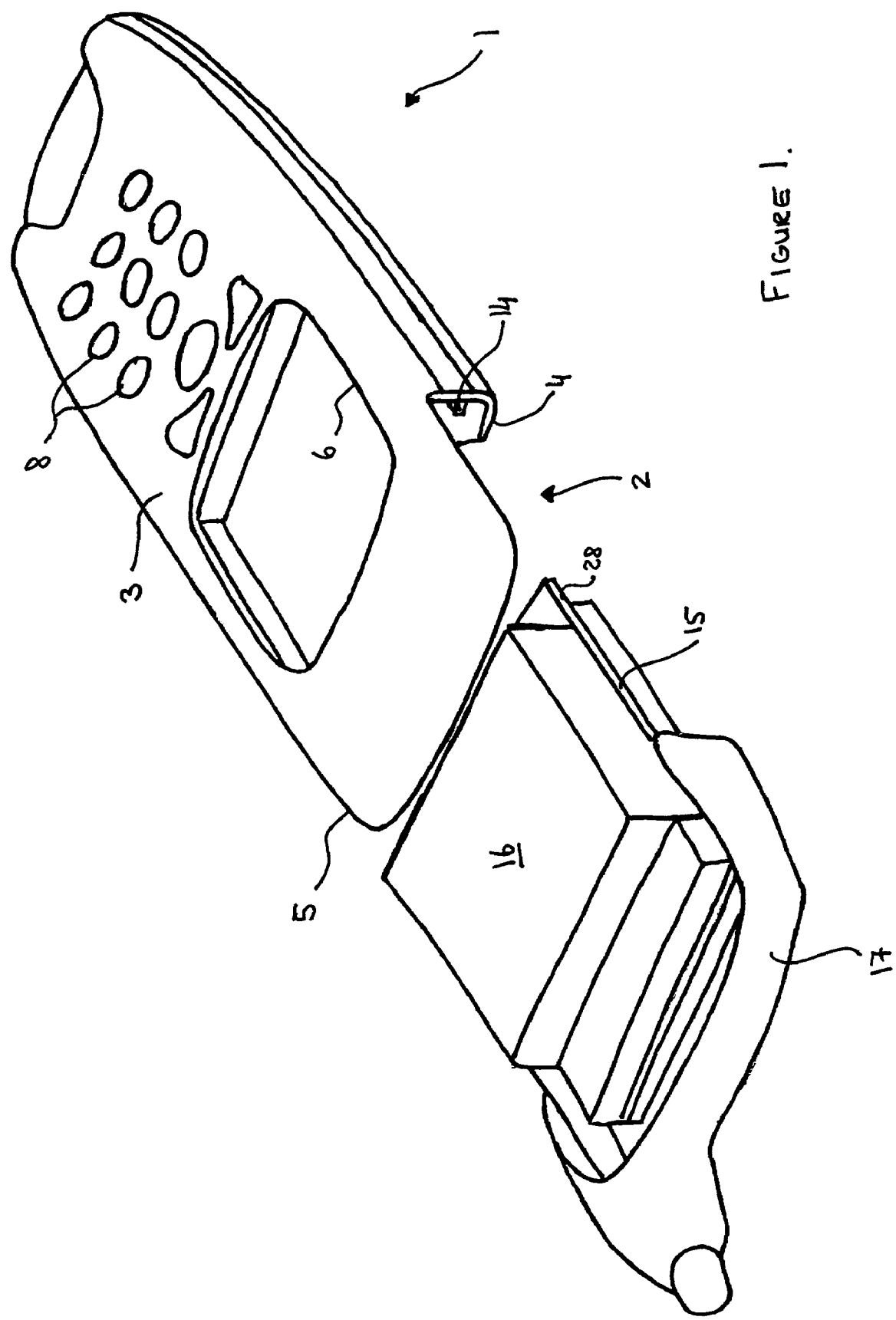
FIG. 1 illustrates a perspective view of the housing of a mobile telephone of the invention together with a module shown removed from the open end of the housing, the module carrying the electronic componentry of the telephone.
Figure 2:
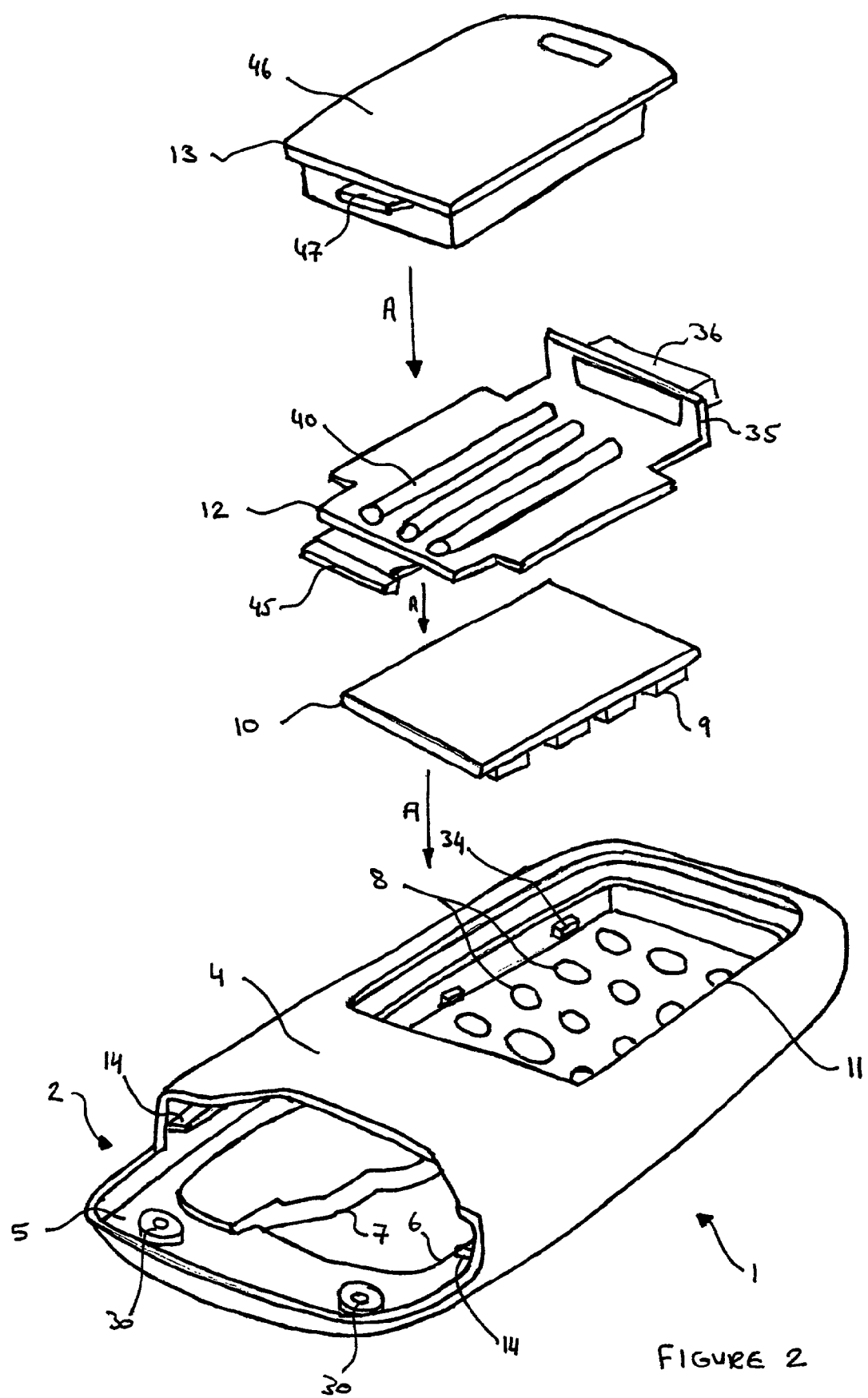
FIG. 2 illustrates a perspective view of the underside of the housing shown in FIG. 1 together with the keymat, keymat retaining plate before insertion into the housing.
Figure 3:
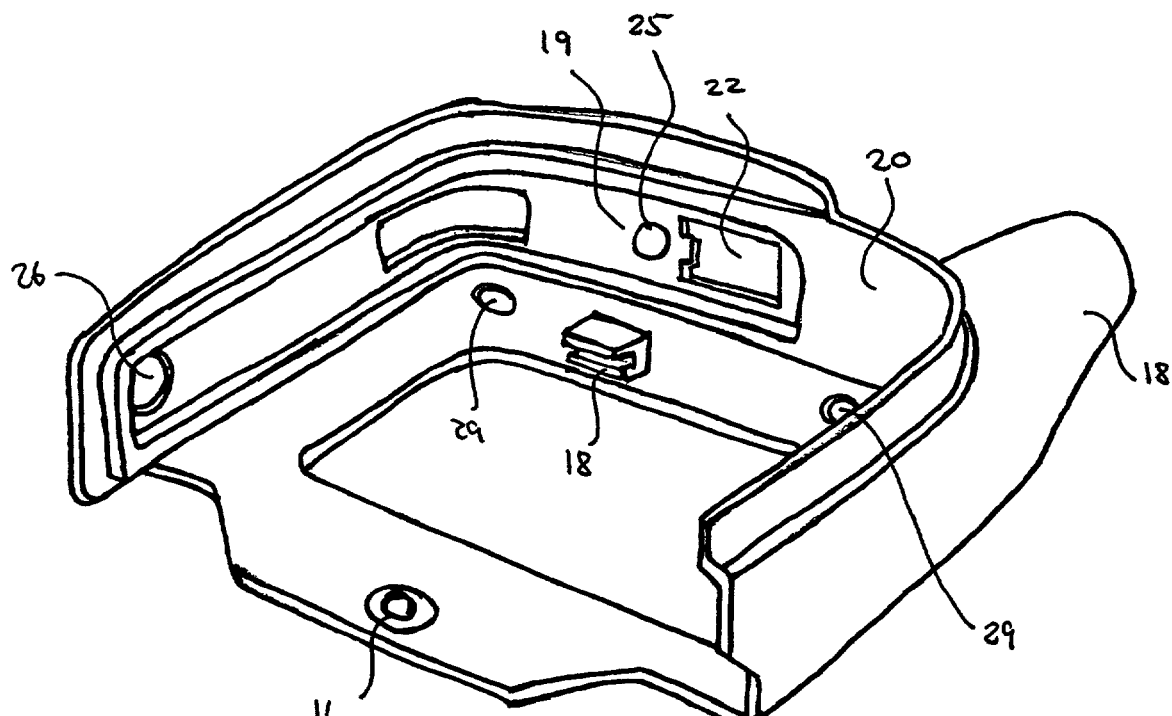
FIG. 3 illustrates a perspective view of the underside of the module shown in FIG. 1.

Referring now to the drawings, there is shown in FIGS. 1 and 2 a housing for a mobile telephone comprising a rigid unitary tubular body 1 open at one end 2. The front face 3 extends forward of the rear face 4 to form an overhang 5. The front face includes an aperture 6 for attachment of a transparent window 7 by laser welding (part of the window is shown fitted in the aperture 6, in FIG. 2). Beneath the aperture 6 on the front face 3 is an array of smaller openings 8 through which the keys 9 of a keymat 10 may protrude. The rear face 4 has a rectangular aperture 11 therein opposite the array of smaller openings 8 in the front face 3 for insertion of a keymat 10, a keymat retaining plate 12 and a battery pack 13 in the order and direction shown by arrow A in FIG. 2. These components will be explained in more detail hereinafter.

The body 1 includes integrally moulded guide rails 14 formed along each inside edge between the front and tear faces 3,4 to support a printed circuit board 15 and other electronic components 16 such as a liquid crystal display within the body 1. These components are mounted to a module 17 that fits over the open end 2 of the body 1 and interfaces with the edge of the open end 2 to close the body 1. The module 17 has an integrally moulded "U"-shaped clip 18 to receive and support the edge of the printed circuit board 15 and a spigot 16 to support its underside. Other electronic components are mounted to the PCB 15.

Figure 4:
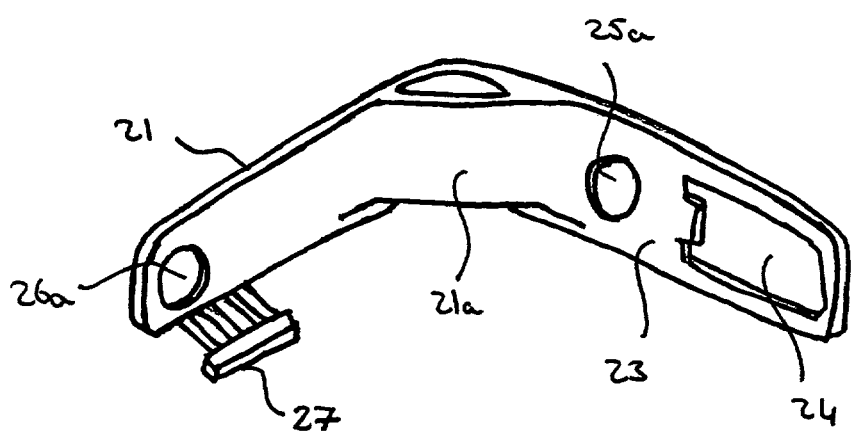
FIG. 4 illustrates a perspective view of the transducer module for fitting to the module illustrated in FIG. 3.

The module 17 includes an integrally formed boss 18 therein through which the antenna of the mobile telephone may extend. A portion 19 of the inner peripheral wall 20 of the module 17 is recessed to receive a transducer module 21 illustrated in FIG. 4, and has a first elongate port 22 to allow for the transmission of infra red waves through the module 17 from an emitter (not shown) mounted to the rear face 23 of the transducer module 21 that has a corresponding opening 24. Two further circular openings 25,26 are provided in the recess to receive an on/off key (not shown) and to allow for transmission of sound through the module 17 from a transducer (not shown). The transducer and on/off key are both mounted to the rear face 23 of the transducer module 21 which is provided with openings 25a, 26a that correspond to the openings in the module 17.

The transducer module 21 is "L" shaped to fit the recess 19 in the peripheral wall 20 of the module 17 and has a reinforcing web 21a to increase its rigidity. A flexible electrical connector 27 extends from the transducer module 21 which connects to an interface on the printed circuit board 15.

The edge 28 of the printed circuit board 15 mounted to the module 17 locates on the top surface of the guide rails 14 and is slideably received within the body 1. When fully inserted into the body 1, the overhang 5 covers the electronic components and PCB 15 on the module 17 and closes the open end 2 of the body 1. The liquid crystal display is visible through the window 7 in the aperture 6 when the module 17 is located on the body 1. The module 17 includes a pair of apertures 29 therein and the body I has a pair of corresponding bosses 30 that are in alignment when the module 17 is fitted to the body 1. Conventional screws 31 (not shown) extend through the apertures 29 and are threadingly engaged in the bosses 30 to releasably secure the module 17 to the body 1.

Figure 5:
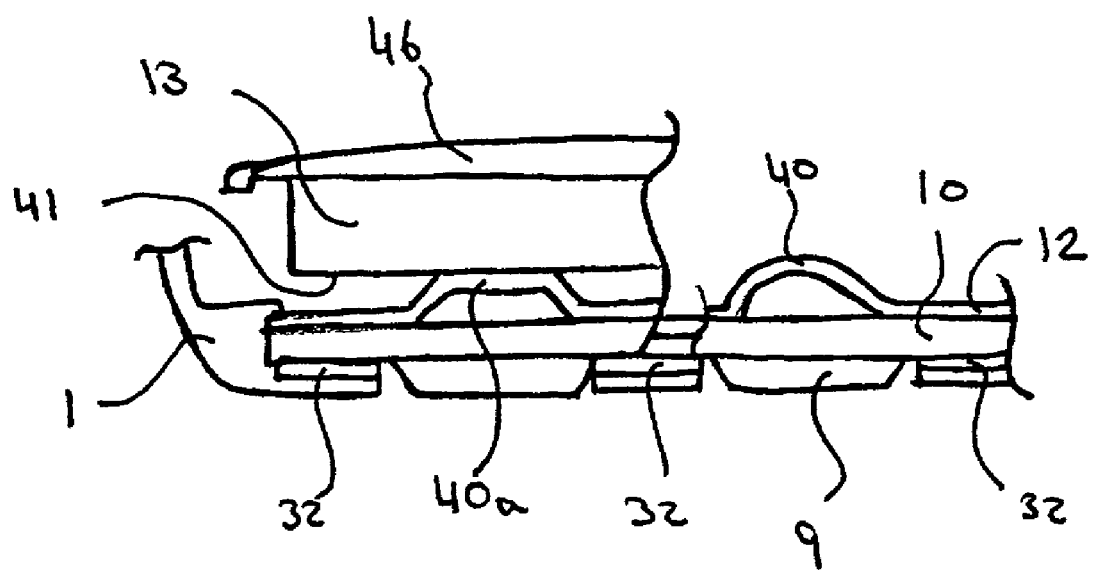
FIG. 5 illustrates a partial cross-section through the housing with the keymat, retaining plate and battery fitted thereto.

Referring now to FIG. 2 and FIG. 5, the keymat 10 is disposed within the body 1 such that the keys 9 protrude through the apertures 8 in the front face 3. The keymat 10 is maintained in position using a layer of adhesive 32 interspersed between the body 1 and the keymat 10. The keymat 10 is positioned within the body 1 by inserting it through the rectangular aperture 11 in the rear face 4. To further retain the keymat 10 in position, the retaining plate 12 is positioned above the keymat 10 and locates under tabs 34 integrally formed on the body 1 between the front and rear faces 3,4. The retaining plate 12 is made from a resilient plastics material such as polyurethane and is a snap-fit under tabs 34.

The retaining plate 12 comprises an end portion 35 bent at right angles to the plane of the plate 12. A support block 36 is mounted to end portion 35 and co-operates with the closed end of the casing to further hold the retaining plate 12 in position in the body 1. Three ribs 40 are deformed out of the plane of the plate 12 directly above the keys 9. As is clearly shown in FIG. 5, when the battery pack 13 is inserted into the aperture 11, the ribs 40 are compressed (see rib 40a in FIG. 5) by the underside 41 of the battery pack 13 to urge the plate 12 against the keymat 10, and the keymat 10 against the body 1. When the battery pack 13 is removed, the resilient nature of the material from which the plate 12 is made causes the ribs 40 to spring back into their original shape, as shown by rib 40 in FIG. 5.

The retaining plate 12 includes an arm 45 that extends laterally from the other end of the plate 12. The printed circuit board 15 contacts the arm 45 when inserted into the body 1 to provide additional support for the printed circuit board 15 and the retaining plate 12.

The battery pack 13 is inserted into the body 1 through the aperture 11 from above (in the direction shown by arrow A in FIG. 2) and the outer cover 46 of the back of the battery pack 13 locates within the edges of the aperture 11. A moulded lip 47 on the cover 46 engages beneath the rear face 4 of the body 1 to retain the battery pack 13 in position.

The body 1 of the housing may be formed using a number of different methods. For example, it may be made in two parts which are subsequently permanently attached together by laser or ultrasonic welding, MIG or TIG welding or by using adhesive along their interface. Alternatively, the body 1 can be formed in one piece by extrusion, by injection moulding or by sheet metal forming. The body 1 can be made from either plastics material or metal.

Many modifications and variations of the invention falling within the terms of the following claims will be apparent to those skilled in the art and the foregoing description should be regarded as a description of the preferred embodiments only.

The invention claimed is:

1. A housing for a mobile telecommunication device, comprising a unitary body having a front face and a rear face, and a closing member,
    wherein said body has an open end for insertion of electronic components of the device therein, a plurality of apertures in the front face for receiving keys of a keymat mounted on an inner wall of the body, and an opening in the rear face opposite the apertures for receiving a battery pack,
    wherein at least one of the electronic components is mounted on the member, and the member closes the open end of the body when said electronic component mounted on the member is inserted into the body, and
    wherein the electronic components of the device are substantially housed by the unitary body upon insertion.

2. A housing according to claim 1, wherein the member includes a support for locating and retaining a printed circuit board thereon.

3. A housing according the claim 2, wherein said support includes an integrally moulded clip to receive the edge of a printed circuit board and a location spigot to support the underside thereof.

4. A housing according to claim 1, wherein a portion of the inner peripheral wall of the member includes a recess to receive a transducer module.

5. A housing according to claim 1, including a guide on the body to receive and support electronic components mounted on the member.

6. A housing according to claim 5, wherein the guide is a rail.

7. A housing according to claim 1, wherein the body includes means for releasably securing a keymat retaining plate over the keymat.

8. A housing according to claim 7, wherein said means comprises an integrally formed tab on the body for securing the retaining plate thereunder.

9. A housing according to claim 8, wherein the retaining plate is formed from a resilient flexible material and is a snap fit beneath the integrally formed tab on the body.

10. A housing according to claim 1, wherein a portion of the body overlaps the member, said body and member including co-operating parts to mount the member on the body.

11. A housing according to claim 10, wherein the co-operating parts includes a flange on the member that forms an interference fit with the body.

12. A housing according to claim 10, including a lock for releasably securing the member mounted to the body.

13. A housing according to claim 12, wherein said lock includes an aperture in the member and a boss in the body, fastening means being insertable through the aperture for location in the boss.

14. A mobile telecommunication device incorporating the housing according to claim 1.

15. The mobile telecommunication device according to claim 14, including a keymat, a keymat retaining plate and a battery pack, the retaining plate being configured such that the keymat is biased against the housing by the retaining plate when the battery pack is mounted in the housing.

16. The mobile telecommunication device according to claim 15, wherein the retaining plate includes resiliently deformable regions raised out of the plane of the plate, said regions being deflected back towards the plane of the plate by the battery pack mounted in the housing, thereby biasing the keymat against the housing.

17. The mobile telecommunication device according to claim 16, wherein said resiliently deformable regions are a plurality of spaced parallel ribs.

18. A method for forming a housing of a mobile telecommunication device, comprising forming a unitary body having a front face and a rear face, and forming a closing member, wherein said body has an open end for insertion of electronic components of the device therein, a plurality of apertures in the front face for receiving keys of a keymat mounted on an inner wall of the body, and an opening in the rear face opposite the apertures for receiving a battery pack, wherein at least one of the electronic components is mounted on the member, and the member closes the open end of the body when said electronic component mounted on the member is inserted into the body, and wherein the electronic components are substantially housed by the unitary body upon insertion.

19. A method according to claim 18, wherein the body is extruded.

20. A method according to claim 18, wherein the body is formed from sheet metal.

21. A housing for a mobile telecommunication device, comprising:

means for substantially enclosing components of the mobile telecommunication device inside a unitary body having a front face and a rear face, said components being inserted into the body through an open end of the body, means for retaining a keymat to an inner wall of the unitary body, the keymat having a plurality of keys each protruding through one of a plurality of apertures in the front face of the unitary tubular body, means for receiving a battery pack through an opening on the unitary tubular body in the rear face opposite the apertures, and means for closing the open end of the unitary body, wherein at least one of the electronic components is mounted on said means for closing, the open end of the body closes when said electronic components mounted on the means is inserted into the body.

* * * * *